(12) United States Patent
Liu et al.

(10) Patent No.: US 6,266,395 B1
(45) Date of Patent: Jul. 24, 2001

(54) SINGLE-ENDED SUBSCRIBER LOOP QUALIFICATION FOR XDSL SERVICE

(75) Inventors: Gin Liu; Michael A. Campbell, both of Brampton (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/389,360

(22) Filed: Sep. 3, 1999

(30) Foreign Application Priority Data

Aug. 31, 1999 (CA) .................................................. 2281208

(51) Int. Cl.[7] ...................................................... H04M 1/24
(52) U.S. Cl. .............................. 379/27; 379/24; 379/30; 379/32; 370/248; 324/533; 324/534
(58) Field of Search ................................... 379/1, 27, 28, 379/30, 6, 24, 26, 32; 370/241, 248, 484, 487, 522; 324/532, 533, 534

(56) References Cited

U.S. PATENT DOCUMENTS

| | | | |
|---|---|---|---|
| 4,105,995 | 8/1978 | Bothof | 340/146.1 |
| 4,205,204 | 5/1980 | Clenney | 179/16 |
| 4,870,675 | 9/1989 | Fuller | 379/5 |
| 5,881,130 | 3/1999 | Zhang | 379/6 |
| 5,920,846 | 7/1999 | Storch et al. | 705/7 |
| 6,014,425 | * 1/2000 | Bingel et al. | 379/27 |
| 6,061,392 | * 5/2000 | Bremer et al. | 375/222 |
| 6,091,713 | * 7/2000 | Lechleider et al. | 370/248 |

* cited by examiner

Primary Examiner—Curtis Kuntz
Assistant Examiner—Binh K. Tieu
(74) Attorney, Agent, or Firm—Kent Daniels; Swabey Ogilvy Renault

(57) ABSTRACT

A method and apparatus for single-ended qualification of subscriber loops for xDSL services is described. The method involves first screening a subscriber loop database record for disqualifying devices or services on the subscriber loop. If none are found, a set of predetermined electrical characteristics of the subscriber loop are derived from information in the database, or directly measured using test equipment at a central office end of the subscriber loop. The electrical characteristics are used to compute an available bandwidth on the subscriber loop for xDSL services. The advantage is the rapid and inexpensive qualification of subscriber loops which reduces response time to potential customer queries and facilitates deployment of xDSL services.

42 Claims, 5 Drawing Sheets

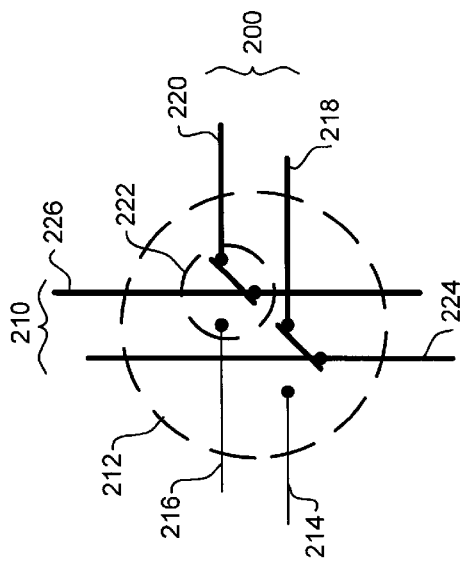
FIG. 3
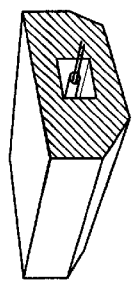
FIG. 5
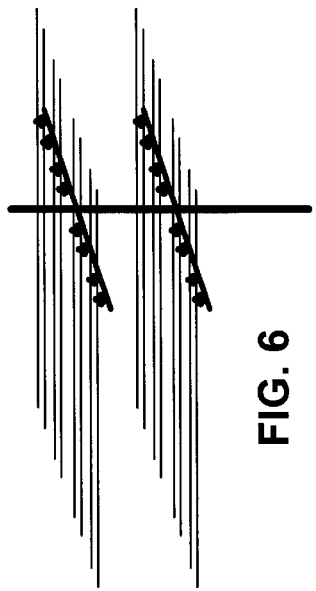
FIG. 4
FIG. 6
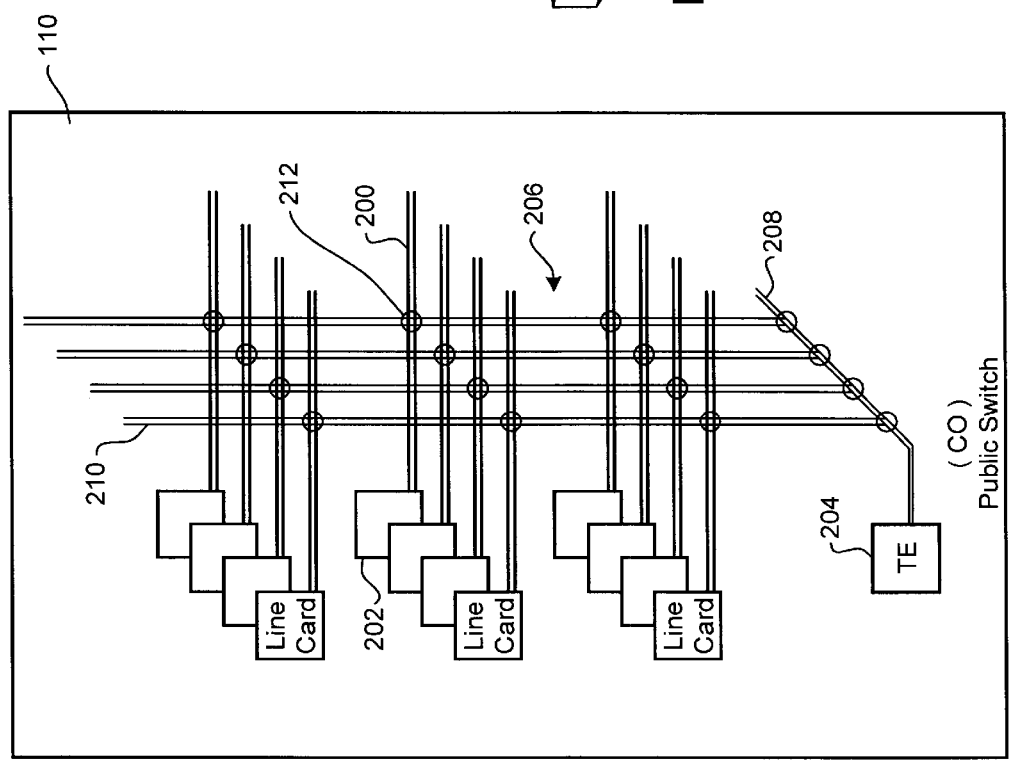
FIG. 2

SINGLE-ENDED SUBSCRIBER LOOP QUALIFICATION FOR XDSL SERVICE

TECHNICAL FIELD

The invention relates generally to the provision of data services over subscriber loops in the Public Switched Telephone Network and, in particular, to a method and apparatus for the single ended qualification of subscriber loops to determine the suitability of such loops for the provision of high-speed data services.

BACKGROUND OF THE INVENTION

The exponential increase in the popularity of the Internet and related data services has prompted service providers in the Public Switched Telephone Network (PSTN) to seek new technologies for delivering high-speed data services to their customers. One solution is provided by Digital Subscriber Line (DSL) technologies. Several DSL technologies offer high-speed services over existing copper facilities, commonly referred to as "subscriber loops". Such technologies include Asymmetrical Digital Subscriber Line (ADSL); High-bit-rate Digital Subscriber Line (HDSL); Rate Adaptive Digital Subscriber Line (RDSL); Symmetric Digital Subscriber Line (SDSL); and, very High-speed Digital Subscriber Line (VDSL). These digital subscriber line technologies are known collectively as "xDSL" services.

A problem encountered in the provision of xDSL services is that the subscriber loops have been largely neglected from a technology upgrade perspective. Existing subscriber loops were designed for voice telephony as opposed to high-speed data services. Consequently, many subscriber loops include wire gage changes and bridged taps (unused extension lines) which limit the available bandwidth. Other equipment installed on subscriber loops may also render the loop unsuitable for the provision of xDSL service. For example, load coils, voice frequency repeaters, loop extenders, Private Branch Exchanges (PBXs), line intercepts and incompatible data services all render subscriber loops unsuitable for the provision of xDSL service.

Testing apparatus for determining the physical and/or electrical characteristics of subscriber loops is known. Such apparatus is taught, for example, in U.S. Pat. No. 4,105,995 which issued Aug. 8, 1978 to Bothof et al.; U.S. Pat. No. 4,870,675 which issued Sep. 26, 1989 to Fuller et al.; and, U.S. Pat. No. 5,881,130 which issued Mar. 9, 1999 to Zhang. While such apparatus enables the determination of certain physical and/or electrical characteristics of the subscriber loop, none enable single ended determination of the bandwidth capacity of the subscriber loop for the provision of xDSL service.

Consequently, it has been the practice of service providers in the PSTN to dispatch a skilled technician to the premises of a customer who has requested, or expressed an interest in an xDSL service. The technician coordinates testing with another technician at the service provider's Central Office (CO). The dispatch of the skilled technician contributes significantly to the service provider's operating overhead and delays service provision due to the scheduling of subscriber loop qualification.

In order to reduce the cost and improve the efficiency of subscriber loop qualification, several solutions have been tried without success. For example, basic metallic measurements of electrical characteristics such as voltage, resistance and capacitance readings of the subscriber loop have been tried. However, these metallic measurements do not assess the high bandwidth range of the subscriber loop and consequently fail to provide a consistently accurate assessment of bandwidth available for xDSL service. Time Domain Reflectrometry (TDR) readings have also been tried without success. The problem is that TDR readings do not take physical properties of the cable or network topology information into account. The prior art methods have attempted to use measurements alone to generate rate predictions. Consequently, those prior art methods have failed because they do not correct for the physical properties of the subscriber loop, or equipment on the subscriber loop.

In order to screen customer inquiries and limit the number of requests for subscriber loop qualification for xDSL service, many service providers in the PSTN have implemented postal code maps which permit a subscriber to retrieve an indication of whether their subscriber loop is suitable for xDSL. The indication is retrieved, for example, by inputting a ZIP code or a postal code into a query screen available on the Internet. While such tools effectively limit the requests for subscriber loop qualification, in many ways they work against both the subscriber and the service provider. The postal code maps are based solely on an approximation of a distance between the subscriber premises and a serving CO in the PSTN. Because of this limitation, they cannot take into account the factors which may affect the suitability of the subscriber loop for xDSL service. Besides, because of the granularity of the postal code system, many subscriber loops suitable for the provision of xDSL service may be disqualified even though they are capable of providing some level of service.

There therefore exists a need to significantly reduce the costs of qualifying subscriber loops for xDSL service.

There also exists a need for a method and apparatus to permit the single ended qualification of subscriber loops.

There further exists a need to provide a method and apparatus for the single-ended qualification of subscriber loops which reduces the skill level required by operators performing the qualification.

There further exists a need for a method and apparatus for single ended qualification of subscriber loops which enables the pre-qualification of subscriber loops to permit a service provider to inform any service subscriber of the qualification of their subscriber loop on request.

SUMMARY OF THE INVENTION

It is therefore an object of the invention to provide a simple and economical method and apparatus for the single ended qualification of subscriber loops for xDSL service.

Accordingly, an aspect of the invention provides a method of qualifying a subscriber loop for xDSL services. The subscriber loop is connected to a public switched telephone network (PSTN) via a switch at a central office (CO). The method comprises the steps of: determining, from a CO end of the subscriber loop, one or more electrical characteristics of the subscriber loop; and estimating, based on the determined electrical characteristics, an xDSL bandwidth available on the subscriber loop.

A further aspect of the present invention provides a system for qualifying a subscriber loop for xDSL services. The subscriber loop is connected to a public switched telephone network (PSTN) via a switch at a central office (CO). The system comprises a processor adapted to determine, from a CO end of the subscriber loop, one or more electrical characteristics of the subscriber loop, and to estimate an xDSL bandwidth of the subscriber loop based on the determined electrical characteristics.

Thus the present invention provides a method and apparatus for single ended qualification of subscriber loops for xDSL services. Electrical characteristics of the subscriber loop preferably include values for: resistance (R); capacitance (C); inductance (L); and conductance (G) for each cable segment forming the subscriber loop. Additional electrical characteristics can, for example, include a wide band noise (WBN) value on the subscriber loop, and the presence of any one or more of: bridged taps; load coils; loop extenders; and other devices in the subscriber loop. The electrical characteristics of the subscriber loop can be determined by any one or more of; probing the subscriber loop from the CO end; estimation based on physical characteristics of the subscriber loop, and use of default values. In an embodiment of the invention, values of R, L, G, and C are contained in a cable properties database and may be accessed on the basis of the physical characteristics of the subscriber loop.

The physical characteristics of the subscriber loop preferably include information of: length; conductor size; cable insulation type; and cable installation type of each cable segment forming the subscriber loop, as well as information of devices installed on the subscriber loop. These physical characteristics of the subscriber loop are preferably obtained from database queries, but at least some physical characteristics can be estimated from measured electrical properties of the subscriber loop, and/or approximated using default values.

In an embodiment of the invention, a carrier service database includes information of physical characteristics of the subscriber loop as well as devices and services installed on the subscriber loop. In this case, a subscriber loop record containing information specific to the loop is extracted from the data base and screened for devices and services known to be incompatible with xDSL services. If any such incompatible devices or services are found, the loop is disqualified. On the other hand, if no incompatible devices or services are found, the electrical characteristics of the subscriber loop are used to calculate estimates of the up-stream and down-stream bit-rates (band-width) of wide-band xDSL signals transmitted over the subscriber loop.

In a preferred embodiment of the invention, prior to band-width estimation, the subscriber loop is probed to detect the presence of any one or more of metallic faults, load coils, or line intercepts. If any of these conditions are detected, the subscriber loop is disqualified.

BRIEF DESCRIPTION OF THE DRAWINGS

The invention will now be explained by way of example only and with reference to the accompanying drawings, in which:

FIG. 2 is a schematic diagram showing the interconnection of line cards for providing telephone services, subscriber loops delivering telephone services and test equipment at a public switch in the PSTN;

FIG. 3 is a schematic diagram showing a subscriber loop to be qualified;

FIG. 4 is a schematic diagram showing a type of subscriber loop deployment in which a cable containing at least one subscriber loop is buried underground;

FIG. 5 is a schematic diagram showing another type of subscriber loop deployment in which a cable containing at least one subscriber loop is installed in an underground conduit;

FIG. 6 is a schematic diagram showing yet another type of subscriber loop deployment in which cables containing subscriber loops are installed on poles;

DETAILED DESCRIPTION OF THE PREFERRED EMBODIMENT

The invention provides a method and apparatus for the single ended qualification of copper wire subscriber loops in a switched telephone network.

Figure 1:
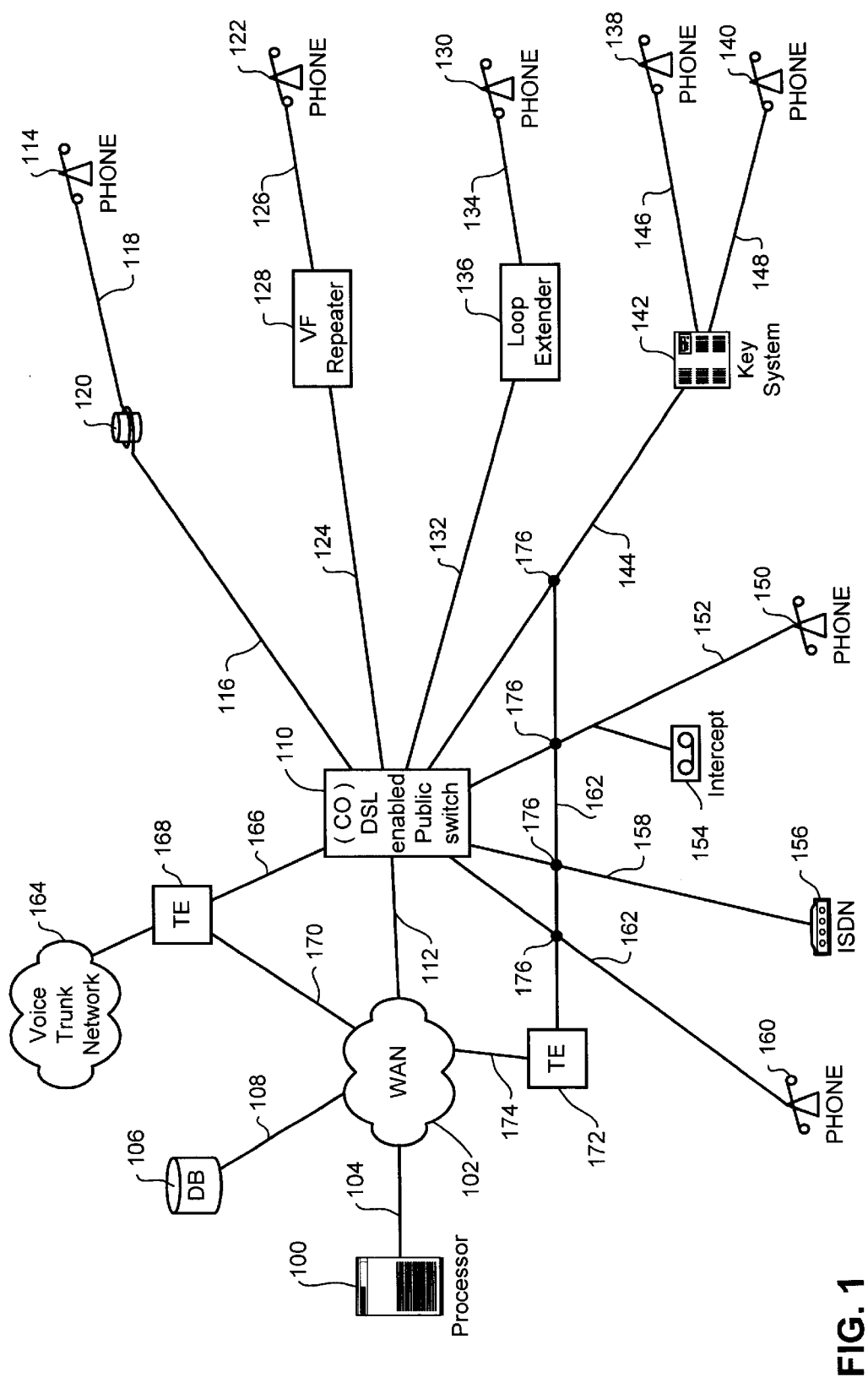
FIG. 1 is a connection diagram showing a local area network of a telephone services provider connected to a public switch with a number of associated subscriber loops.

FIG. 1 is a schematic diagram showing a central office (CO) 110 in switched telephone network connected to a plurality of voice-grade subscriber loops. In accordance with the invention, a processor 100 may access the CO 110, and various test equipment for qualifying subscriber loops. Access may be accomplished, for example, via a wide area network (WAN) 102 to which the processor 100 is connected by a data link 104. Processor 100 executes an algorithm for subscriber loop qualification to determine the suitability of the subscriber loops for xDSL services.

A carrier service database 106 is connected to the WAN by a link 108. The carrier service database 106, which may either be located at the switch or (preferably) on a server attached to the WAN, contains subscriber equipment records indexed by subscriber directory numbers, for example. The carrier service database may include the physical characteristics of the subscriber loops, such as loop length, wire gauge, bridge taps, etc. Also, addressable on the local area network are other central offices (not shown) providing telephone services to other subscribers.

Telephone services are provided to a subscriber 114 via a subscriber loop divided in two segments 116 and 118. This particular subscriber loop includes a load coil 120 installed between segments 116 and 118. Load coils are the used to improve transmission of signals in the voice frequency band. Telephone services are provided to subscriber 122 via a subscriber loop comprising two segments 124 and 126. Installed between subscriber loop segment 124 and subscriber loop segment 126 is a voice frequency repeater 128. Voice frequency repeaters are used to amplify and retransmit signals in the voice frequency band. Telephone services are provided to subscriber 130 via a subscriber loop divided into two segments 132 and 134. Installed between loop segments 132 and 134 is a loop extender 136. Loop extenders are used to amplify signals in the voice frequency band. Telephone services are provided to subscribers 138 and 140 connected to a key system 142 via subscriber loop 144. Subscribers 138 and 140 are connected to the key system 142 via links 146 and 148. Key systems are used to connect private telephone networks to the public switched telephone network. Intercepted telephone services are provided to subscriber 150 via subscriber loop 152. Installed on subscriber loop 152 is a recording system 154 which records all the voice frequency payload carried by the subscriber loop 152. Integrated Services Digital Network (ISDN) services are provided to subscriber 156 over subscriber loop 158. Plain Old Telephone Service (POTS) voice-grade telephone service is provided to a subscriber 160 by a single segment subscriber loop 162. Of the above described subscriber loop configurations, only the subscriber loop 162 is suitable for supporting xDSL services. All others of the subscriber loops contain devices or support services that are incompatible with xDSL services.

FIG. 2 it is a schematic diagram showing a portion of the public's witch 110 which serves subscriber loop 200 terminated on line card 202. Test equipment 204 can be connected to individual subscriber loops through an access grid 206 which consists of an hierarchy of buses 208 and 210. Subscriber loop 200 can be respectively connected to the access grid 206 by electrically activating a connection point 212. This permits the probing of individual subscriber loops to determine electrical characteristics of each loop.

FIG. 3 shows the details of the connection point 212. Each line card 202 provides a tip and ring pair of conductors 214 and 216. During normal operation tip and ring pairs 214 and 216 are connected to the tip and ring pairs 218 and 220 of the subscriber loop 200. This connection is provided at the connection point by relays 222. During testing of the subscriber loop 200, the tip and ring pair 218 and 220 of subscriber loop 200 is connected to an associated tip and ring pair 224 and 226 of a bus 210 in the access grid 206. This interconnection permits the test equipment 204 to be connected directly to the subscriber loop 200.

FIGS. 4, 5 and 6 illustrate different methods used to install cables carrying subscriber loops between the central office and subscriber premises. These methods of installation comprise: buried cable shown in FIG. 4 in which the cable is simply laid in a trench and carried with earth.; underground cable shown in FIG. 5 in which the cable is run through a conduit buried in the earth; and, aerial cable shown in FIG. 6 in which the cable is supported by poles above the ground. Each type of installation requires cable with particular properties.

Figure 7:
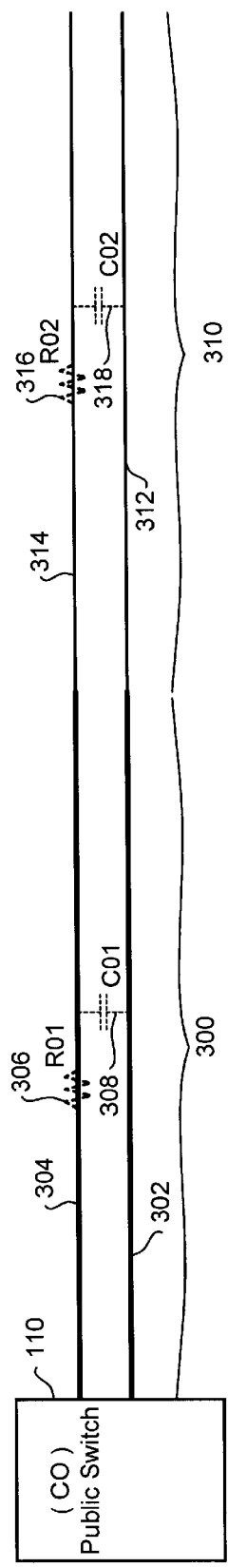
FIG. 7 is a schematic diagram showing a typical subscriber loop to be qualified using the methods and apparatus in accordance with the invention.

FIG. 7 is a schematic diagram showing the deployment of a subscriber loop 200 connected to a public switch 110. Subscriber loop 200 is made up of two segments. A first segment 300 includes a tip and ring pair 302 and 304 of a first wire gauge. This first segment 300 is characterized by having a resistance 306 and an electrical capacitance 308. The second segment 310 is made up of tip and ring pairs 312 and 314 of a second gauge. This second segment is characterized by an electrical resistance 316 and an electrical capacitance 318.

Figure 8:
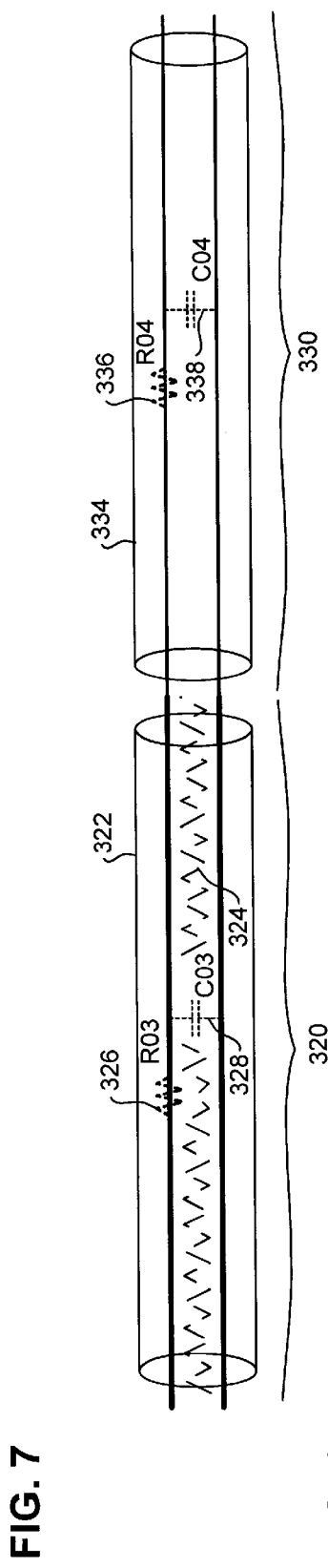
FIG. 8 is a schematic diagram showing a shielded subscriber loop.

FIG. 8 shows another type of subscriber loop deployment in which the tip and ring pairs are shielded. Subscriber loops segment 320 is shielded by an outer sheath filled with a dielectric insulator 324. This segment is characterized by an electrical resistance 326 and an electrical capacitance 328. Subscriber loop segment 330 is shielded by a sheath 332 that is air filled. This segment is characterized by an electrical resistance 336 and an electrical capacitance 338.

Figure 9:
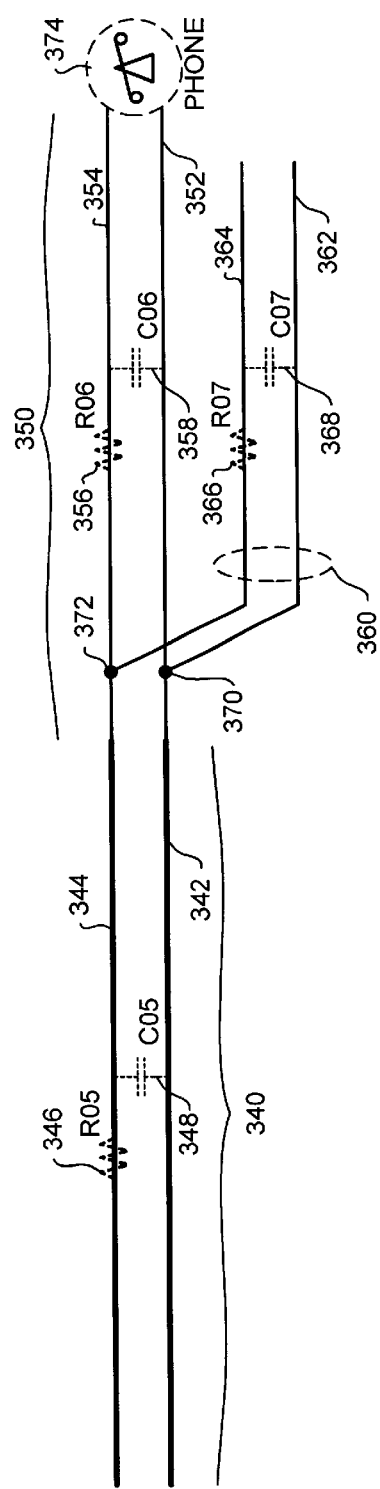
FIG. 9 is a connection diagram showing a subscriber loop with a bridge tap.

FIG. 9 shows a subscriber loop connected to a telephone 374, the subscriber loop includes a bridged tap 360. In this configuration subscriber loop segment 340 includes a tip and ring pair 342 and 344 having an electrical resistance 346 and an electrical capacitance 348. Loop segment 350 includes a tip and ring pair 352 and 354 having an electrical resistance 356 and an electrical capacitance 358. A bridged tap segment 360 includes a tip and ring pair 362 and 364 having an electrical resistance 366 and an electrical capacitance 368, The bridged top segment 360 is connected to the loop segment 350 at connection points 370 and 372.

According to the present invention, subscriber loops can be qualified for xDSL services on an individual basis, or in groups. For example, an individual subscriber loop could be qualified in response to a request for service by the subscriber. Alternatively, a carrier service provider can elect to qualify a group of subscriber loops (e.g. all of the subscriber loops connected to a particular switch) at a time convenient to the carrier service provider, such as, for example, following an upgrade of a switch to enable DSL services to be provided by the switch.

Figure 10:
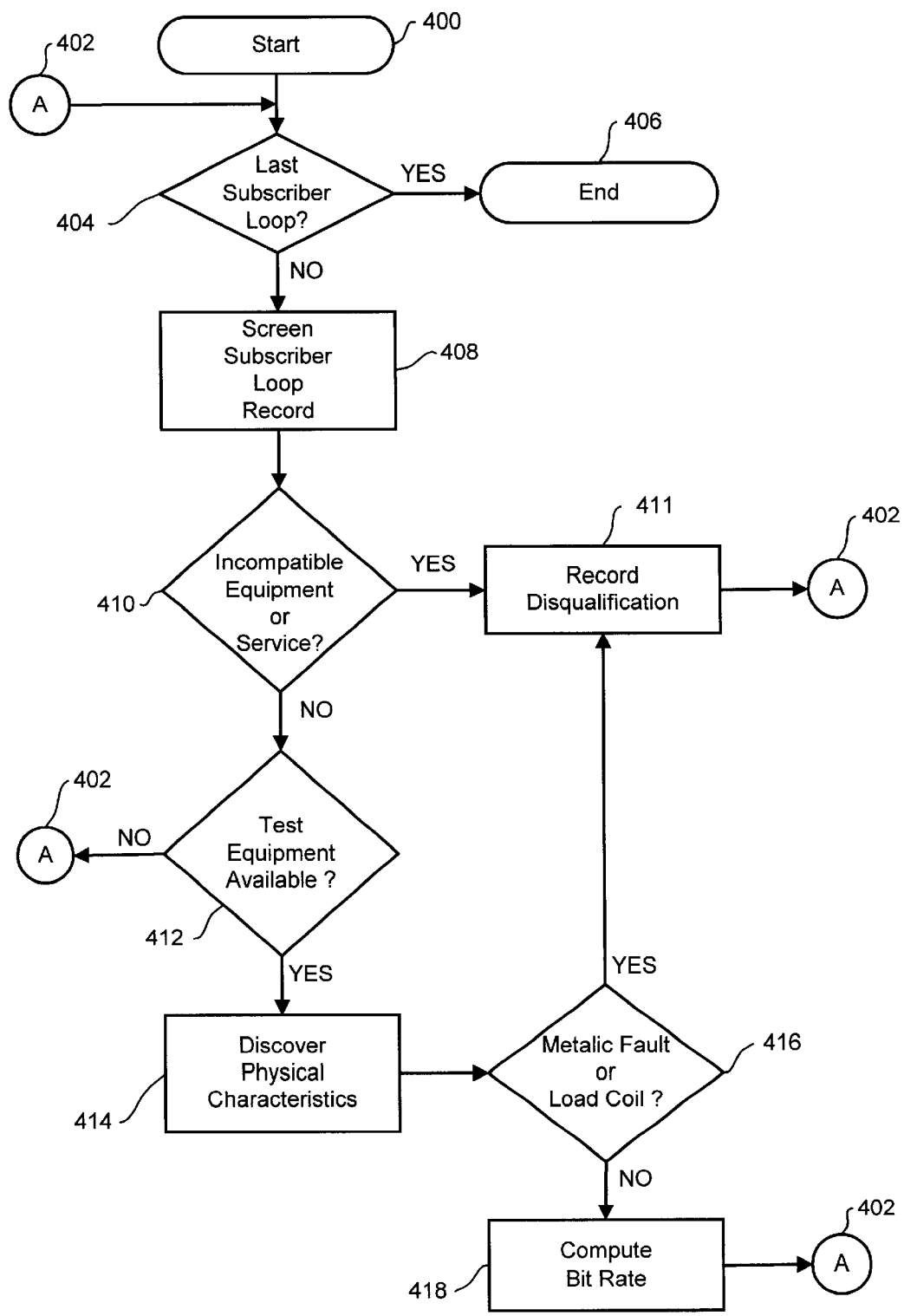
FIG. 10 is a flow chart showing the principal steps of a method in accordance with the invention.

FIG. 10 illustrates a process for qualifying a group of subscriber loops, it being understood that the same process also applies when only a single subscriber loop is to be qualified.

To perform the subscriber loop qualification process, the processor 100 (FIG. 1) is instructed to qualify one or more loops in a start 400. In step 404, the processor 100 determines whether a last subscriber loop identified in a qualification request list has been qualified. If at least one subscriber loop remains to be qualified, the processor 100 queries the carrier service provider database 106, and retrieves a subscriber loop record located using the subscriber directory number, for example. The subscriber loop record contains information respecting the physical characteristics of the subscriber loop and services deployed on the loop. As described above, the information regarding physical characteristics preferably includes the identity (type) of equipment installed for the subscriber loop. The information also preferably provides data describing the make-up of the loop including a length, gauge size, insulation type and installation type for each cable segment (see FIGS. 7–9) forming the subscriber loop.

At step 408, the processor 100 screens the customer record to identify any equipment or services on the subscriber loop that are incompatible with xDSL (typically because they are known to reduce the available bandwidth above voice frequency to zero, or a negligible margin). Incompatible equipment and services include voice frequency (VF) repeaters, line intercepts, loop extenders, induction neutralizing transformers, added main line (AML) carriers, bridge lifters, and private branch exchange (PBX) services. FIG. 1 illustrates exemplary subscriber loops equipped with devices and services which preclude the provision of xDSL services.

If any such incompatible equipment or services are found (step 410), the processor 100 disqualifies the subscriber loop for xDSL services at step 411. Disqualification means that xDSL services cannot be deployed on the subscriber loop until (or unless) the incompatible equipment and/or services are removed. Following disqualification of the subscriber loop, the processor 100 records the disqualification in the subscriber loop record, or one qualification report, or both. The processor selects a next subscriber loop at step 402, and restarts the qualification process.

If no incompatible equipment and/or services are found at step 410, the processor 100 determines (step 412) whether test equipment is available (either co-located with the switch or elsewhere on the network), that is capable of probing the subscriber line to enable discovery of the physical make-up of the subscriber loop.

If test equipment is not available (step 412), then the processor ends evaluation of the subscriber loop, because it lacks sufficient information to estimate available bandwidth.

In this case, the processor 100 selects a new subscriber loop at step 402, and restarts the qualification process. If test equipment is determined to be available (at step 412), then the processor proceeds to discovery of the physical characteristics of the subscriber loop (step 414).

Discovery of the physical characteristics of the subscriber loop can be conducted in any of a variety of ways known in the art, depending primarily on the type of test equipment available. For example, the subscriber loop can be probed using test signals to detect the presence of shorts, opens, grounds and load coils, as taught by U.S. Pat. No. 4,870,675 (Fuller et al.). The methods described by Fuller can be adapted to detect any of a variety of devices which have a detectable signature, such as, for example, line intercepts, and added main line (AML) carriers. Test equipment is also known for probing subscriber loops (through the switch), to measure values of , for example, AC and DC voltages, resistance and capacitance over the entire subscriber loop. Using these measurements in conjunction with known cable properties, it is possible to infer a physical make-up of the subscriber loop. It is also known to connect test equipment to the subscriber loop independently of the switch (i.e. on the analogue side of the loop) using a suitable loop test equipement, such as, for example, Telaccord™ manufactured by Tollgrade Communications, Inc. This equipment, which is illustrated in FIG. 2, permits measurement of wide-band noise on the subscriber loop, in addition to other electrical characteristics. Wide band noise on the subscriber loop cannot be measured through the switch. Accordingly, if test equipment capable of measuring wide band noise is not available, a default value (e.g. −140 dBm/Hz) can be used to compute a Signal to Noise Ratio (SNR), as will be explained below in more detail.

Some communication devices (e.g. modems) available on the market generate high levels of noise in the wide-band region. Where such devices are installed on the subscriber loop (i.e. at the customer premises), it is possible that a measured value of wide band noise will be significantly higher than the default value. In such cases, it is preferable to adjust the default value of the wide band noise to a higher value.

Typically, the subscriber loop record will not contain information of metallic faults or load coils. Accordingly, at step 416, the processor controls the test equipment to probe the subscriber loop to test for metallic faults (e.g. shorts or grounds), line intercepts, and load coils (as well as any other devices which preclude transmission of wide-band xDSL signals). If any such conditions are found, the processor disqualifies the subscriber loop (step 411) because the subscriber loop cannot support xDSL services until these conditions are resolved. Otherwise, the processor completes the discovery of the physical characteristics of the subscriber loop, and prepares for band-width estimation (step 418).

Upon completion of discovery of the physical characteristics of the subscriber loop (steps 414–416), the processor preferably updates the customer record with the discovered characteristics, and then proceeds with bandwidth estimation (step 418).

As mentioned above, at step 418, the processor 100 estimates the total bandwidth available for wide-band xDSL signals transmitted over the subscriber loop. The total bandwidth is simply a total bit-rate at which data can be transmitted in each direction (e.g. up-stream and down-stream) over the subscriber loop. In some cases, the up-stream and down-stream bandwidths may be similar, in which case it may be possible to qualify the subscriber loop by calculation of bandwidth in only one direction. However, up-stream and down-stream bandwidths typically differ significantly, and it is normally preferable to estimate values for both the up-stream and downstream bandwidths.

Figure 11:
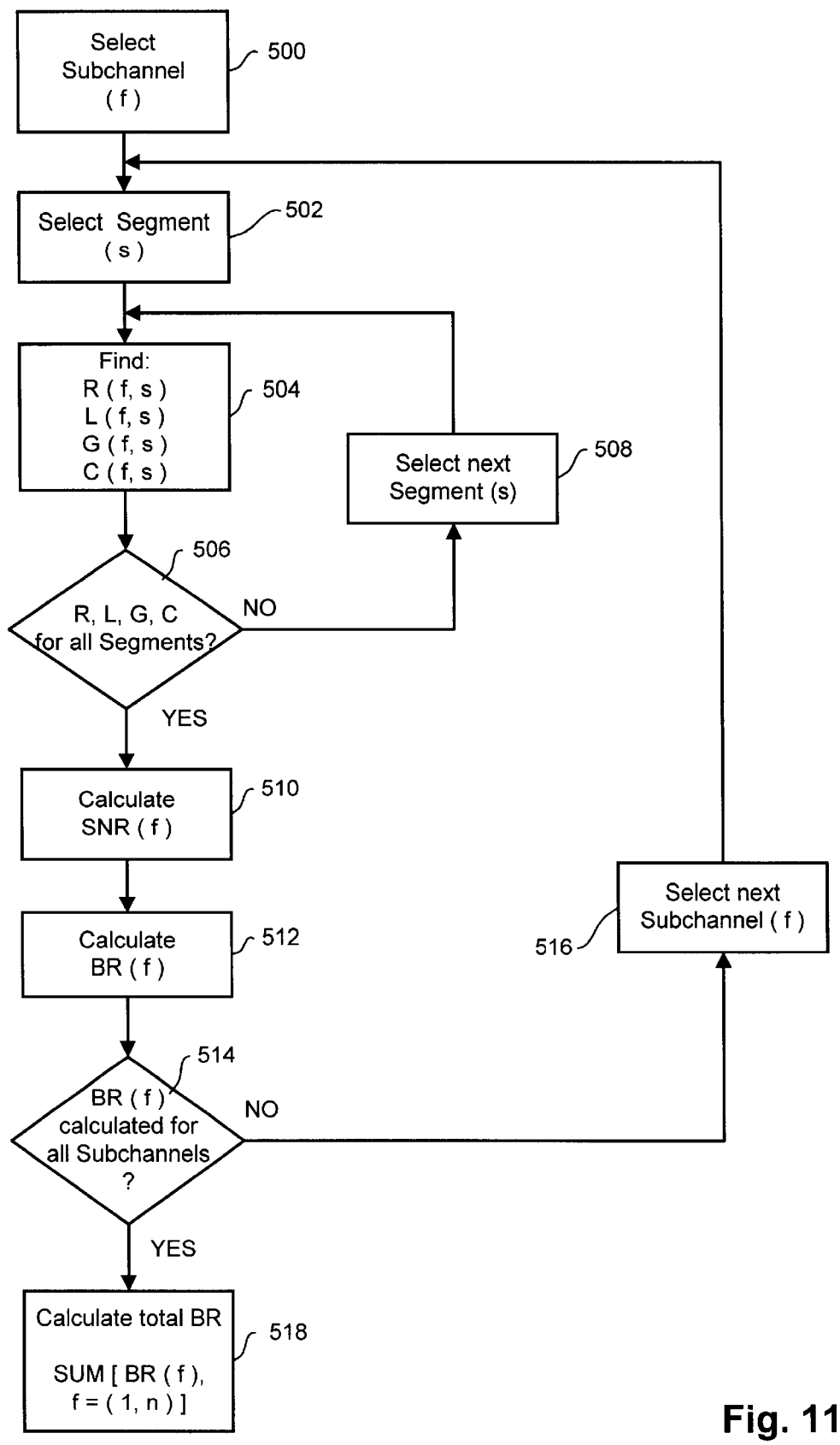
FIG. 11 is a flow chart showing the principal steps in a process for computing a bit rate that can be supported by a subscriber loop, to determine if the subscriber loop is qualified to support an xDSL service.

FIG. 11 illustrates in greater detail the process of estimating bandwidth (step 418 of FIG. 10) in accordance with the present invention. The band width (or bit-rate of data transmission) available on a subscriber loop (or any portion thereof) at a particular frequency can be calculated from the signal-to-noise ratio (SNR) of the subscriber loop at that frequency. The SNR at a particular frequency can, in turn, be calculated from values of resistance (R), inductance (L), conductance (G) and capacitance (C) of the loop. Additionally, the values of R, L, G, and C are primarily functions of physical properties of the cable (e.g. conductor gauge (size), insulation type, and temperature) and may also vary with frequency. Accordingly, for the purpose of the estimating the total bandwidth, the wide-band xDSL signal is considered to be divided into a plurality of subchannels (e.g. of 4312 Hz width), with each subchannel having a predetermined center-frequency. Additionally, the subscriber loop is considered to be divided into one or more cable segments having a respective combination of length, conductor gauge, insulation type, and installation type. This permits values of R, L, G, and C to be found for each cable segment, which can be aggregated to calculate a SNR for each sub-channel. The SNR for each sub-channel is then used to determine a bit-rate (bandwidth) for each subchannel. The subchannel bit-rates are then summed to find the total bandwidth available for wide-band xDSL signal over the subscriber loop.

With reference now to FIG. 11, at step 500, the processor 100 selects a subchannel having a center frequency (f), and, at step 502, a cable segment (s). At step 504, the processor 100 finds values of R(f,s), L(f,s), G(f,s), and C(f,s) for the selected center frequency (f) and cable segment (S). These values can conveniently be found by performing a look-up function in a cable properties database (not shown), which provides representative values of R, L, G, and C for each combination of conductor gauge and insulation type, measured at specific temperatures. An exemplary table of the cable properties database is as follows:

| gauge | 26AWG | | | |
| Insulation | PIC | | | |
| temp. | 70° F. | | | |
| Center Frequency | R | L | G | C |
| ... | ... | ... | ... | ... |
| 20000 | 83.48 | 0.1868 | 0.295 | 15.72 |
| ... | ... | ... | ... | ... |
| 30000 | 83.8 | 0.1854 | 0.295 | 15.72 |
| ... | ... | ... | ... | ... |

The data stored in the cable properties database may be supplied by a cable manufacturer and/or obtained from reference texts, such as, for example the Digital Subscriber Loop Signal and Transmission Handbook, Whitman B. Reeve, IEEE Telecommunications Handbook Series, 1995. In order to extract the appropriate data from the cable properties database, the processor 100 uses the installation type (e.g. aerial, buried, or underground) from the customer record to determine a temperature parameter applicable to the selected cable segment (s). Exemplary temperature parameters are as follows:

| Installation type | temperature parameter |
| --- | --- |
| Aerial | T(s) = Maximum temperature at CO + 30° F. |
| Buried | T(s) = (Maximum temperature at CO) − 10° F. |
| Underground | T(s) = 68° F. |

Using the temperature parameter, in combination with the conductor gauge, and insulation type of the selected cable segment (s), values of R, L, G, and C can be extracted from the cable properties database for temperatures bracketing (i.e. above and below) the temperature parameter. Values of R(f,s), L(f,s), G(f,s), and C(f,s) for the selected cable segment (s) can then be approximated from the extracted values by using a known interpolation technique.

At step 506, the processor determines whether values of R(f,s), L(f,s), G(f,s), and C(f,s) have been found for all of the cable segments (s) forming the subscriber loop. If the result of this determination is "NO", then the processor selects the next cable segment (at step 508) and repeats steps 504 and 506.

When values of R(f,s), L(f,s), G(f,s), and C(f,s) have been found for all of the cable segments forming the subscriber loop, the processor 100 calculates (at step 510) a signal to noise ratio (SNR) for the subscriber loop at the center frequency of the selected subchannel (f).

Calculation of the signal to noise ratio (SNR) for the subscriber loop at the center frequency of the selected subchannel (f) can be performed using known techniques, such as, for example, as described in *ADSL/VDSL Principles: A Practical And Precise Study of Asymmetric Digital Subscriber Lines and Very High Speed Digital Subscriber Lines*, by Denis J. Rauschmayer, Macmillan Technical Publishing, 1999. Thus, as an intermediate step, the values of R(f,s), L(f,s), G(f,s), and C(f,s) can be used to calculate values of A(s), B(s), C(s), and D(s) for each cable segment (s) at the center frequency of the selected subchannel (f). For a cable segment, values of A(s), B(s), C(s), and D(s) are given by:

$$A(s) = \text{Cosh}(P \times l)$$

$$B(s) = \text{Sinh}(P \times l) \times I$$

$$C(s) = \frac{\text{Sinh}(P \times l)}{I}$$

$$D(s) = A(s)$$

where:

$$P = \sqrt{(R + j\omega L) \times (G + j\omega C)} \quad \text{(the Propagation Constant)}$$

$$I = \sqrt{\frac{R + j\omega L}{G + j\omega C}} \quad \text{(the Characteristic Impedance), and}$$

$l$ is the cable segment length.

A bridged tap can be treated, for the purposes of the present calculation as a virtual cable segment disposed between adjacent cable segments. In the case of a bridged tap, values of A(s), B(s), C(s), and D(s) are given by:

$$A(bt) = 1$$

$$B(bt) = 0$$

$$C(bt) = \frac{1}{\sqrt{\frac{R + j\omega L}{G + j\omega C}} \times \text{Coth}(P \times L)} = \frac{1}{I \times \text{Coth}(P \times L)}$$

$$D(bt) = 1$$

These values of A(s), B(s), C(s), and D(s) for each cable section (s) are then combined to find values of A, B, C and D for the entire subscriber loop at the center frequency of the selected subchannel (f). Thus:

$$\begin{bmatrix} A & B \\ C & D \end{bmatrix} = \begin{bmatrix} A1 & B1 \\ C1 & D1 \end{bmatrix} \times \begin{bmatrix} A2 & B2 \\ C2 & D2 \end{bmatrix} \cdots$$

It should be noted that, in the above calculation of A, B, C and D for the entire subscriber loop, the order of calculation of the segment matrices preferably follows the order in which the cable segments are arranged on the subscriber loop (in a direction moving away from the switch. Thus where the subscriber loop includes a bridged tap, the matrix of A(bt), B(bt), C(bt) and D(bt) values will be arranged between the corresponding matrices of the adjacent cable segments.

From the values of A, B, C and D for the entire subscriber loop, the loop attenuation (preferably based on an assumed 100 ohm termination) can be found, again as described by Rauschmayer Finally, the processor 100 calculates the signal to noise ratio SNR for the subscriber loop at the center frequency of the selected subchannel (f) as follows:

SNR=(Transmission Power)−(Loop Attenuation)−(noise)−(margin)

where:

(Transmission Power) is a default value equal to −36.5 dBm/Hz for down-stream signals and equal to −38 dBm/Hz for up-stream signals;

(noise) is a value derived from the wide band noise of the subscriber loop. For up-stream signals, noise=wide band noise. For down-stream signals, noise=wide band noise—loop attenuation. In order to arrive at a more conservative estimate of SNR for down-stream signals, it is preferable to set (noise) equal to the greater of the default wide-band noise value and (wide band noise—loop attenuation); and (margin) is a default value of 6 dB.

The above calculation of SNR will yield two values of SNR: one each for up-stream and down-stream xDSL signals. It is thus possible to calculate, for example as described in *DSL Simulation Techniques and Standards Development for Digital Subscriber Line Systems* by Dr. W. Y. Chen, MacMillan Technical Publishing, 1998, respective up-stream and downstream transmission bit-rates (bandwidth) at the center frequency of the selected subchannel(f).

At step 514, the processor 100 determines whether up-stream and downstream transmission bit-rates have been calculated for all of the subchannels. If the result of this determination is "NO", then the processor selects the next subchannel (f) at step 516, and then repeats steps 502 through 514, until up-stream and downstream transmission bit-rates have been calculated for all of the subchannels.

When up-stream and downstream transmission bit-rates (bandwidth) for all of the subchannels have been computed, the processor 100 proceeds to step 518 to calculate the total up-stream and downstream transmission bit-rates (bandwidth) for the entire wide-band xDSL signal. This final calculation is a simple summation of all of the respective up-stream and down-stream subchannel bit-rates, as all of the subchannels operate to transport parallel data streams.

Upon completion of step 518, the estimated total up-stream and downstream transmission bit-rates (bandwidth) of the subscriber loop can be displayed on a monitor (not shown), or stored in the subscriber loop record for future use or output in a suitable report format. If a single subscriber loop is being evaluated, the processes of qualifying the subscriber loop can terminate at this point. If a group of subscriber records are being qualified, the process returns to step 402 (FIG. 10) for selection of the next subscriber loop.

Field tests have been conducted to determine the accuracy of the methods and apparatus in accordance with the invention. The field tests were conducted by dispatching a skilled technician to subscriber premises of subscriber loops qualified using the method and apparatus. The field tests have substantiated that the methods and apparatus in accordance with the invention consistently predict with acceptable accuracy the bandwidth available on a subscriber loop for xDSL services. The methods and apparatus can therefore be relied on for single-ended subscriber loop qualification.

The embodiments of the invention described above are intended to be exemplary only, the scope of the invention being limited solely by the scope of the appended claims.

We claim:

1. A method for single-ended qualification of a subscriber loop for xDSL services, the subscriber loop being connected to a public switched telephone network (PSTN) via a switch at a central office (CO), comprising the steps of:
   a) screening a subscriber loop record including information identifying devices connected to the subscriber loop and services deployed on the subscriber loop, to identify any one of a set of predetermined disqualifying conditions associated with the subscriber loop; and
   b) if no disqualifing conditions are identified:
      i) determining, from a CO end of the subscriber loop, one or more electrical characteristics of the subscriber loop; and
      ii) estimating, based on the determined electrical characteristics, the xDSL bandwidth of the subscriber loop.

2. A method as claimed in claim 1, wherein the set of predetermined disqualifying conditions comprises: an intercepted line on the subscriber loop; an existing service on the subscriber loop that is incompatible with xDSL services; and a device installed on the subscriber loop that is of a type which prevents transmission of wide band xDSL signals.

3. A method as claimed in claim 2, wherein the devices of a type which prevents transmission of wide band xDSL signals comprise any one or more of voice frequency (VF) repeaters, line intercepts, loop extenders, induction neutralizing transformers, added main line (AML) carriers, bridge lifters, and private branch exchanges (PBXs).

4. A method as claimed in claim 1, wherein information saved in the subscriber loop record is obtained from any one or more of: information entered in the carrier service database at time of installation of devices; information entered in the carrier service database at a time of deployment of services; and information respecting determined electrical characteristics of the subscriber loop.

5. A method as claimed in claim 1, wherein the step of determining one or more electrical characteristics of the subscriber loop comprises one or more of: probing the subscriber loop from the CO end of the subscriber loop; approximating based on information respecting physical characteristics of the subscriber loop; and using predetermined default values.

6. A method as claimed in claim 5, wherein the step of determining one or more electrical characteristics of the subscriber loop comprises using a greater one of a value determined by probing the subscriber loop from the CO end of the subscriber loop, and a predetermined default value.

7. A method as claimed in claim 5, wherein the electrical characteristics of the subscriber loop comprise any one or more of: metallic faults; a resistance (R); a capacitance (C); an inductance (L); a conductance (G); and wide band noise (WBN).

8. A method as claimed in claim 7, wherein the electrical characteristics of the subscriber loop further comprises the presence of any one or more of: bridged taps; load coils; loop extenders; and other devices in the subscriber loop.

9. A method as claimed in claim 1, wherein the step of estimating an xDSL bandwidth of the subscriber loop comprises the steps of:
   a) estimating, based on the electrical characteristics of the subscriber loop, a loop attenuation of the subscriber loop;
   b) estimating a signal-to-noise ratio (SNR) based on the estimated loop attenuation and at least one other electrical characteristic; and
   c) estimating a total bit-rate for data transmission over the subscriber loop, based on the estimated SNR.

10. A method as claimed in claim 9, wherein the step of determining one or more electrical characteristics of the subscriber loop comprises the steps of determining information respecting physical characteristics of the subscriber loop, and estimating one or more electrical characteristics of the subscriber loop based on the information respecting physical characteristics of the subscriber loop.

11. A method as claimed in claim 10, wherein the step of determining information respecting physical characteristics of the subscriber loop comprises determining, for each cable segment forming the subscriber loop, information respecting any one or more of: a length; a conductor size; a cable insulation type; a cable installation type; and bridged taps on the subscriber loop.

12. A method as claimed in claim 11, wherein the step of determining information respecting physical characteristics for each cable segment forming the subscriber loop comprises any one or more of: retrieving data from the subscriber loop record; analyzing information respecting detected electrical characteristics of the subscriber loop; and using predetermined default values.

13. A method as claimed in claim 9, wherein the step of estimating a loop attenuation of the subscriber loop comprises calculating the loop attenuation for each of a plurality of subchannels of a wide band xDSL signal.

14. A method as claimed in claim 13, wherein, for each respective subchannel:
   a) the step of determining one or more electrical characteristics of the subscriber loop comprises determining a resistance (R), a capacitance (C), an inductance (L), and a conductance (G) of each cable segment of the subscriber loop; and
   b) the step of calculating a loop attenuation for each subchannel comprises calculating, based on the estimated values of R, L, G and C, a loop attenuation of the subscriber loop.

15. A method as claimed in claim 14, wherein the step of calculating a loop attenuation for each subchannel further comprises, for each respective subchannel, the steps of:
   a) calculating, based on the determined values of R, L, G and C for each cable segment of the subscriber loop, respective values of A, B, C and D parameters for each cable segment;
   b) calculating, based on the respective values of A, B, C and D parameters for each cable segment, respective values of the A, B, C and D parameters for the entire subscriber loop; and
   c) calculating, based on the A, B, C and D parameters for the entire subscriber loop, the loop attenuation of the subscriber loop.

16. A method as claimed in claim 14, wherein the step of determining a resistance (R), a capacitance (C), an inductance (L), and a conductance (G) of each cable segment of the subscriber loop comprises estimating values of R, L, G and C for each cable segment of the subscriber loop based on information respecting physical characteristics of the subscriber loop.

17. A method as claimed in claim 16, wherein the step of estimating values of R, L, G and C for each cable segment of the subscriber loop comprises accessing a cable properties database of predetermined representative values of R, L, G and C.

18. A method as claimed in claim 17, wherein the cable properties database contains, for a cable having a conductor gauge and an insulation type, measured values of R, L, G and C taken at a predetermined temperature for each of a plurality of subchannel center frequencies.

19. A method as claimed in claim 18, further comprising the steps of calculating a temperature parameter for a respective cable segment; retrieving, from the cable properties database, values for R, L, G and C measured at first and second temperatures respectively above and below the temperature parameter, and calculating values of R, L, G and C for a temperature corresponding to the temperature parameter by interpolation between the selected data.

20. A method as claimed in claim 19, wherein the temperature parameter is calculated based on one or more of the installation type of the cable segment and an average high temperature at the CO.

21. A method as claimed in claim 14, wherein the step of estimating a signal-to-noise ratio (SNR) comprises calculating the signal-to-noise ratio for each subchannel, based on the respective loop attenuation for the subchannel and the wide band noise value for the subscriber loop.

22. A method as claimed in claim 21, wherein the wide band noise is an electrical characteristic of the subscriber loop, and is determined by one of: detecting the wide band noise from the CO end of the subscriber loop; and using a default value.

23. A method as claimed in claim 22, wherein the default value of the wide band noise is −140 dBm/Hz.

24. A method as claimed in claim 21, wherein the step of estimating a total bit-rate for data transmission over the subscriber loop comprises the steps of estimating a respective bit rate for each subchannel based on the respective estimated SNR for each subchannel, and summing the estimated bit rates.

25. A system for single-ended qualification of a subscriber loop for xDSL services, the subscriber loop being connected to a public switched telephone Detwork (PSTN) via a switch at a central office (CO), the system comprising:
   a) a subscriber loop record including information identifying devices connected to the subscriber loop and services deployed on The subscriber loop; and
   b) a processor adapted to:
      i) screen the subscriber loop record to identify any one of a set of predetermined disqualifying conditions associated with he subscriber loop;
      ii) determine one or more electrical characteristics of the subscriber loop from a CO end of the subscriber loop; and
      iii) estimate the xDSL bandwidth of the subscriber loop using the determined electrical characteristics.

26. A system as claimed in claim 25, wherein the processor is adapted to determine one or more electrical characteristics of the subscriber and estimate the xDSL bandwidth of the subscriber loop only if none of the set of predetermined disqualifying conditions are identified during the screening of the subscriber loop record.

27. A system as claimed in claim 25, wherein the set of predetermined disqualifying conditions comprises: an intercept on the subscriber loop; an existing service on the subscriber loop that is incompatible with xDSL services; and, a device installed on the subscriber loop that is of a type which prevents transmission of wide band xDSL signals.

28. A system as claimed in claim 27, wherein the devices of a type which prevents transmission of wide band xDSL signals comprise any one or more of: voice frequency (VF) repeaters, line intercepts, loop extenders, induction neutralizing transformers, added main line (AML) carriers, bridge lifters, and private branch exchanges (PBXs).

29. A system as claimed in claim 25, wherein information saved in the subscriber loop record is obtained from any one or more of: information entered in the carrier service database at a time of installation of devices; information entered in the carrier service database at a time of deployment of services; and information respecting electrical characteristics of the subscriber loop.

30. A system as claimed in claim 25, further comprising test equipment operatively connected to the PSTN and responsive to command signals from the processor to probe the subscriber loop to detect electrical characterstics of the subscriber loop.

31. A system as claimed in claim 30, wherein the test equipment is adapted to detect, from the CO end of the subscriber loop, any one or more of: metallic faults; a resistance (R); and a capacitance (C).

32. A system as claimed in claim 31, wherein the test equipment is further adapted to detect, from the CO end of the subscriber loop, the presence of any one or more of: load coils; added main line (AML) carriers; and other devices in the subscriber loop.

33. A system as claimed in claim 30, wherein the test equipment is adapted to probe the subscriber loop through the switch, and a wide band noise (WBN) of the subscriber loop is assumed to correspond to a predetermined default value.

34. A system as claimed in claim 30, wherein the test equipment is adapted to probe the subscriber loop independently of the switch, and the test equipment is further adapted to detect a wide band noise (WBN) and a presence of bridged taps of the subscriber loop.

35. A system as claimed in claim 31, wherein the processor is adapted to control the switch to operatively connect the subscriber loop to the detector during detection of electrical characteristics of the subscriber loop.

36. A system as claimed in claim 25, wherein the processor is further adapted to:
   a) determine information respecting physical characteristics of the subscriber loop;
   b) estimate, based on the physical characteristics of the subscriber loop, a loop attenuation of the subscriber loop;

c) estimate a signal-to-noise ratio (SNR) based on the estimated loop attenuation; and d) estimate a total bit-rate for data transmission over the subscriber loop, based on the estimated SNR.

37. A system as claimed in claim 36, wherein the information respecting physical characteristics of the subscriber loop comprises, for each cable segment forming the subscriber loop, data of any one or more of: a length; a conductor size; a cable insulation type; a cable installation type; and bridged taps on the subscriber loop.

38. A system as claimed in claim 25, wherein the processor is operatively connected to the switch.

39. A system as claimed in claim 25, wherein the processor is operatively connected to the PSTN and adapted for communication with the switch.

40. A system as claimed in claim 30, wherein the test equipment is co-located at the CO and adapted for connection to the subscriber loop via the switch.

41. A system as claimed in claim 30, wherein the test equipment is co-located at the CO and adapted for connection to the subscriber loop independently of the switch.

42. A system as claimed in claim 30, wherein the test equipment is operatively connected to the PSTN remote from the CO and adapted for connection with the subscriber loop through the PSTN.

* * * * *

UNITED STATES PATENT AND TRADEMARK OFFICE
CERTIFICATE OF CORRECTION

PATENT NO.    : 6,266,395 B1
DATED         : July 24, 2001
INVENTOR(S)   : Gin Liu et al.

It is certified that error appears in the above-identified patent and that said Letters Patent is hereby corrected as shown below:

Column 5,
Line 11, "FIG. 2 it is" is corrected to read -- FIG. 2 is --;

Column 11,
Line 40, "disqualifing" is corrected to read -- disqualifying --;

Column 13,
Line 63, "Detwork" is corrected to read -- network --;
Line 67, "The" is corrected to read -- the --;

Column 14,
Line 4, "he" is corrected to read -- the --; and
Line 36, "characterstics" is corrected to read -- characteristics --.

Signed and Sealed this

Thirtieth Day of April, 2002

Attest:

Attesting Officer

JAMES E. ROGAN
Director of the United States Patent and Trademark Office